United States Patent
Eastman

[11] Patent Number: 5,940,737
[45] Date of Patent: Aug. 17, 1999

[54] SIGNAL SELECTOR

[75] Inventor: Jon M. Eastman, Los Angeles, Calif.

[73] Assignee: Hughes Electronics Corporation, El Segundo, Calif.

[21] Appl. No.: 08/808,496

[22] Filed: Feb. 27, 1997

[51] Int. Cl.[6] ................................. H04H 1/00
[52] U.S. Cl. .................... 455/3.2; 455/13.1; 455/6.3
[58] Field of Search .................... 455/13.1, 130, 455/3.1, 3.2, 3.3, 6.3, 131, 269, 280, 12.1, 179.1

[56] References Cited

U.S. PATENT DOCUMENTS

| | | | |
|---|---|---|---|
| 4,367,557 | 1/1983 | Stern et al. | 455/4 |
| 4,509,198 | 4/1985 | Nagatomi | 455/3.2 |
| 4,538,175 | 8/1985 | Balbes et al. | 455/3.2 |
| 4,608,710 | 8/1986 | Sugiura | 455/4 |
| 5,005,023 | 4/1991 | Harris | 343/756 |
| 5,027,430 | 6/1991 | Yamauchi et al. | 455/188 |
| 5,073,930 | 12/1991 | Green et al. | 380/10 |
| 5,206,954 | 4/1993 | Inoue et al. | 455/6.2 |
| 5,263,182 | 11/1993 | Park | 455/188 |
| 5,303,403 | 4/1994 | Leong | 455/192 |
| 5,493,718 | 8/1993 | Bayruns et al. | 455/323 |
| 5,603,077 | 2/1997 | Muckle et al. | 455/3.2 |

Primary Examiner—Thanh Cong Le
Assistant Examiner—Darnell R. Armstrong
Attorney, Agent, or Firm—John A. Crook; Michael W. Sales

[57] ABSTRACT

A method and apparatus for receiving and/or processing communication signals having one of a plurality of alternate signal characteristics is provided. In a particular embodiment, a desired satellite signal (e.g. DBS) having a desired characteristic may be selected from a plurality of characteristics. The characteristics may include (among others) satellite location, carrier frequency, and/or polarization state. In a preferred embodiment, a receiver generates a control signal which is coupled to an external device (e.g. LNB, and/or satellite selector). The external device includes a decoder which receives the control signal and configures the external device for processing the desired characteristic. In a preferred embodiment, the control signal comprises a pulse train generated by the receiver utilizing a two voltage level output device under suitable software control.

20 Claims, 3 Drawing Sheets

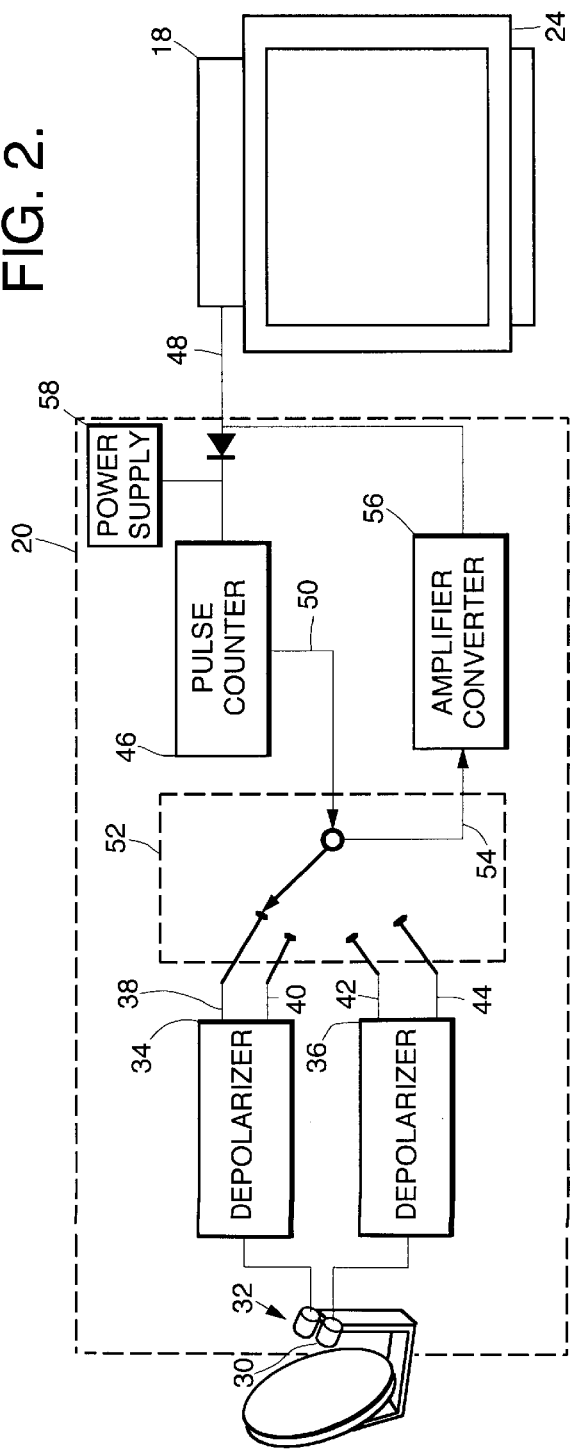
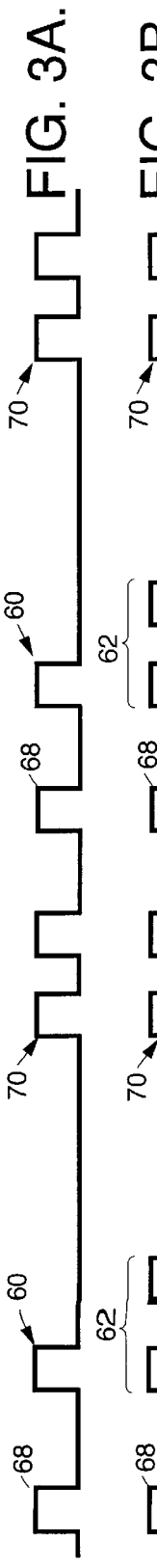
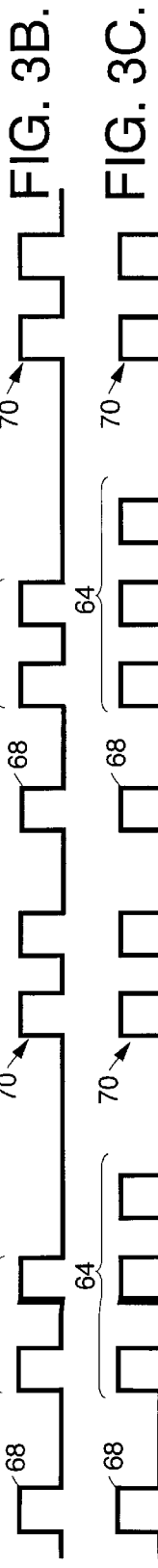
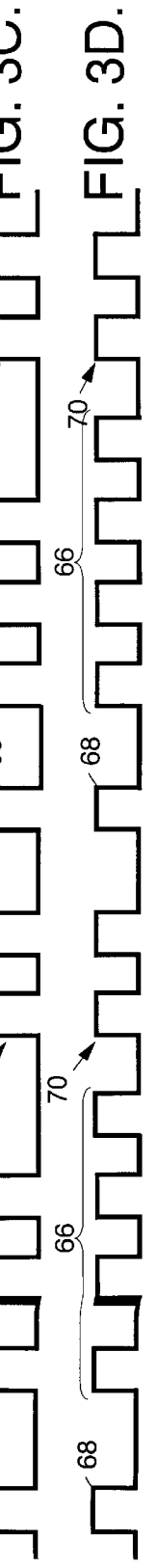

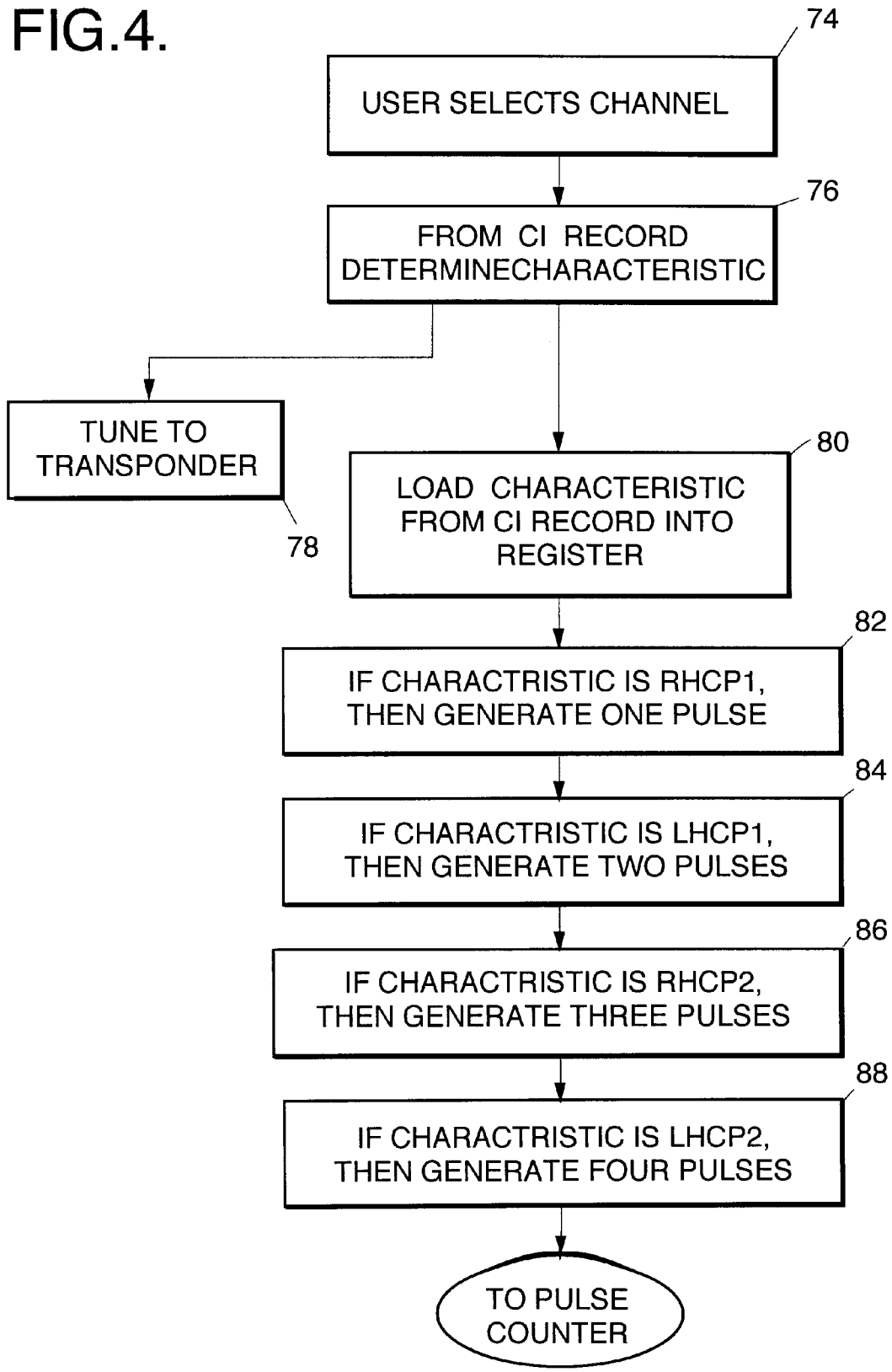

SIGNAL SELECTOR

BACKGROUND OF THE INVENTION

This invention relates to a DBS (direct broadcast satellite) receiving system, and particularly to an improved method and apparatus for selecting a particular one of a multitude of available satellite signals or groups of signals having a common characteristic or state.

In communication systems, including satellite systems, to expand the number of channels that can be transmitted without interference within a given spectrum it is common practice to broadcast a set of channels or frequency bands using one state of polarization, and another set of channels or frequency bands using an alternate polarization. By way of example, a known DBS system employs satellites transmitting orthogonal LHCP (left hand circular polarization) and RHCP (right hand circular polarization) signals. The number of available channels may also be increased by adding additional transmitters, such as additional satellite transponders. These may be co-located but utilize different frequencies (e.g. C-band and Ku-band), or may be at different locations requiring either separate or multi-focus receiving antennas and electronics.

In a known system the DBS subscriber has an IRD (integrated receiver-decoder) which is used to tune a desired channel from the available channels.

However, because a set of channels is broadcast using one polarization state and another set using an alternate polarization state, the subscriber must have the capability of selecting (automatically through the IRD) a channel from one or the other of the alternately polarized sets of signals.

In known systems, upon user selection of a particular channel the IRD determines whether that channel is being downlinked as a LHCP signal or a RHCP signal. In known manners, it then develops one of two possible constant output voltage states (e.g. 13 volts or 17 volts) associated with the desired polarization state. The constant output voltage is applied to an LNB (low noise block converter) located at the site of the antenna, which decodes the applied output voltage and selects the commanded LHCP or RHCP signals for reception and processing.

However, with additional satellites (e.g. at different locations) or groups of signals (e.g. at different frequencies) becoming available to the DBS subscriber, the two-state voltage command currently used to select one of a set of two possible signal characteristics or states (e.g. polarizations) is no longer adequate. There exists a need to provide, with a minimum of difficulty or expense, remote selection capabilities for controlling multi-state remote equipment (e.g. antenna selection and/or LNB states) which may, in certain embodiments, be compatible with existing IRDs.

SUMMARY OF THE INVENTION

In accordance with one aspect of the present invention, there is provided a DBS receiving system which overcomes the aforedescribed inability of two-output voltage IRDs to select satellite signals having a given characteristic (e.g. satellite location, downlink frequency, and/or polarization state) from a set which may, in some embodiments, include more than two alternatives. The receiving system is useful in communication systems capable of delivering signals having a plurality of different characteristics and includes one or more selectors responsive to a state selection signal having a number of states at least equal to the number of alternative signal characteristics. The selector(s) includes a command decoder for decoding the state selection signal, and apparatus (e.g. switching apparatus) responsive to the command decoder output for selecting a particular one of the signal characteristics corresponding to the particular state of the state selection signal.

The state selection signal may take a variety of forms. In accordance with one aspect of the invention, the state selection signal may be a pattern of pulses or other state transitions whose count is indicative of a particular selected signal characteristic. For example, the transmission of a single pulse might indicate selection of a LHCP signal from a first satellite, whereas transmission of three pulses might indicate selection of a RHCP signal from a second satellite. The pulses may preferably comprise two quasi-constant voltage levels corresponding to the two-output DC voltage levels available in known IRDs for selecting LNB polarization states.

The invention itself, together with further objects and attendant advantages, will best be understood by reference to the following description of presently preferred embodiments, taken in conjunction with the accompanying drawings.

BRIEF DESCRIPTION OF THE DRAWINGS

FIG. 2 is a block diagram of the FIG. 1 system illustrating a preferred embodiment of the present invention.

FIGS. 3A–3D are pulse diagrams of satellite signal selection commands employed in a preferred embodiment of the present invention.

FIG. 4 is a basic flow diagram of a software download in accordance with an aspect of the present invention.

DESCRIPTION OF THE PREFERRED EMBODIMENTS

Figure 1:
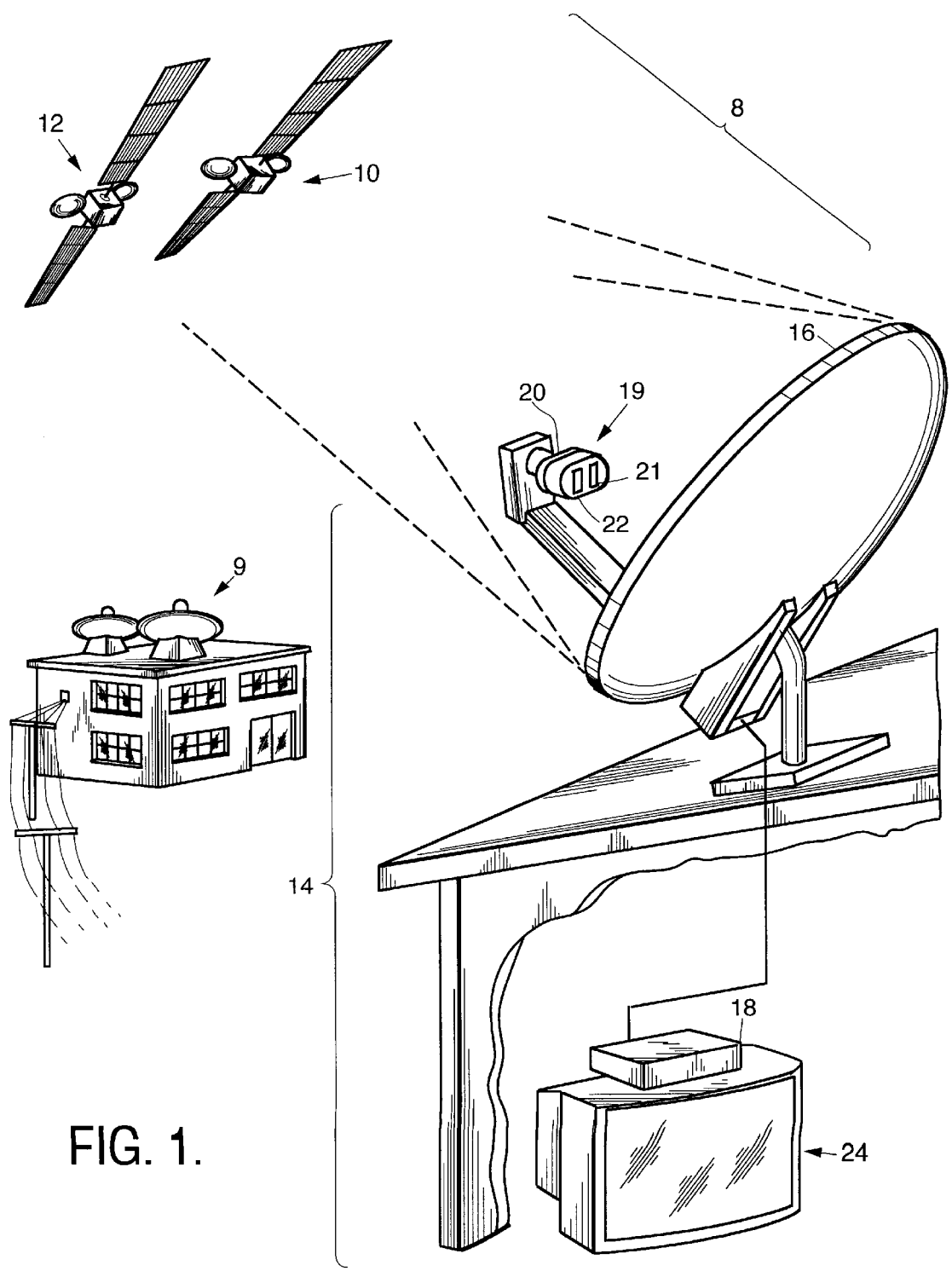
FIG. 1 schematically illustrates a satellite communication system embodying the principles of the invention.

FIGS. 1-2 schematically illustrate a satellite communication system 8 representing a preferred embodiment of the invention, comprising, in general terms, a broadcast center 9 from which television, audio, and/or data signals are uplinked to satellite(s) 10, 12. The satellite(s) 10, 12 contain a number of transponders which relay the signals to a large number of distributed signal receivers, one of which is shown at 14. It should be understood that the invention may be used in systems utilizing a single satellite, a plurality of co-located satellites, or plural satellites at different orbital locations. It may also be used in terrestrial communication systems utilizing ground-based transmitters transmitting signals having a plurality of characteristics. The embodiment illustrated and discussed below includes two satellites in different orbital locations, each transmitting groups of signals having RHCP and LHCP. An embodiment having two signal characteristics (RHCP and LHCP) may comprise a system having the general design and construction of the DSS® system in the United States.

The broadcast center 9 receives programming via satellite, terrestrial fiber optic paths, magnetic tape, or otherwise. The incoming programming may be digitized (if required) and converted to component serial digital signals. The serial digital signals may be routed to specialized uplink signal processing system equipment for video compression and coding, audio encryption, video encryption, multiplexing with user data or network control data, error control encoding, broadcast multiplexing and broadcast modulation (e.g. QPSK, quaternary phase shift keying). The resultant signals are then uplinked to the satellites 10, 12.

The satellite receiver 14 is illustrated as comprising a collector 16 which is coupled to an IRD 18. A feedhorn 19 supports a low noise block converter or LNB 20. As will be described in more detail hereinafter, the collector 16 focuses signals received from the satellites 10, 12 upon receiving elements in the LNB, such as via separate inlet slots 19, 20 in the dual focus LNB 20 illustrated. These slots may correspond to the focii of signals from each of the satellites 10, 12 respectively. It should be understood that other LNB designs (e.g. separate LNBs, and/or separate reflectors) may alternatively be used and that a greater or lesser number of each element is possible.

In a present representative communication system, the satellite collector 16 is preferably of small diameter (e.g., 45 centimeter) and adapted for customer installation. The IRD 18 preferably includes a database of azimuth/elevation "look-angles" to assist in locating the transmitting satellite (s). Video and audio signals are fully decoded and displayed only when an access card or "smart card" containing proper authorization is inserted into the IRD 18. The output of the IRD 18 may be supplied to a television receiver such as shown at 24, or to a VCR, computer, audio reproducer, and/or other recording, processing or reproduction device.

Known satellite communication systems for delivery of entertainment to the home have employed one or more satellites typically broadcasting a first set of channels or frequency bands in a first polarization state, and a second set of channels or frequency bands in an alternate polarization state. The LNB contains a depolarizer for separating the received signals into two groups or sets of signals according to their characteristic polarization state. One set of channels is carried in the signals of one polarization, and the other set of channels is carried in the signals having the orthogonal polarization.

The DSS DBS satellite communication system described above utilizes LHCP and RHCP to discriminate between the first and second sets of signals. Other systems use vertical linear polarization and horizontal linear polarization to distinguish the two sets of signals. In either case, the alternate (herein "orthogonal") polarization states constitute a signal characteristic which may be used to select between groups of signals.

The present invention concerns a method and apparatus for use in such a system which is particularly beneficial in a satellite communication system having a plural number of satellites transmitting a total of three or more distinguishable groups of signals having a like number of distinguishing characteristics. The communication system includes a number of satellite receiving systems each having an IRD capable of generating either of two quasi-constant output voltage states intended to command an associated LNB to selectively receive and process one of two signal characteristics. The satellite receiving system as presently known is thus incapable of processing the three or more signal characteristics transmitted by the satellites of an enhanced system comprising (alone or in combination) three or more polarizations, frequency bands, or satellite locations.

In the IRD, responsive to a state selection command or signal corresponding to e.g. a channel which may correspond to one of the three or more signal characteristics, the required signal characteristic corresponding to the desired channel is determined (e.g. from a channel map periodically broadcast to all IRDs). Under software control, there is then developed a state selection signal. In the preferred embodiment the selection signal is generated by toggling an output voltage between a first predetermined level and a second predetermined level to produce a pattern of voltage pulses whose pulse count or other controllable characteristic defines a plurality of distinguishable state selection commands respectively associated with the plurality of signal characteristics.

In an LNB or other receiving, processing and/or selection device external to the IRD, and responsive to the state selection signal, there is selected a particular chosen one of the plurality of signal characteristics corresponding to a particular state selection signal. In the preferred embodiment, the selecting process comprises decoding the state selection signal by counting the number of voltage pulses in the selection signal, and responsive to the decoding, configuring or controlling the associated external device to select or process the particular chosen one of the signal characteristics (e.g. a particular antenna, and/or a selected LNB in a multi-location system, and/or a particular polarization state).

FIG. 2 depicts in block diagram for a satellite receiving system implementing preferred aspects of the present invention. To accommodate two satellites 10, 12, for example, LNB 20 may include physically separated radiation-receiving slots 21, 22 which are located respectively at the focal points of collector 16 for the signals transmitted by the satellites 10, 12 as previously noted. In the illustrated FIGS. 1-2 embodiment, signal pickup means, shown schematically at 30, 32 in FIG. 2, detects satellite signals four groups—two of orthogonal polarization from satellite 10, and two of orthogonal polarization from satellite 12.

The signals from the signal pickup means 30, 32 are supplied to depolarizers 34, 36 which separate the signals according to their state of polarization in a manner well known in the art. The output of depolarizers 34, 36 is delivered on lines 38, 40, 42, and 44. The depolarizers are preferably integral to the LNB. Where separate LNBs are utilized, multiple depolarizers may be used.

As will be explained in more detail hereinafter, a state selection signal is issued by IRD 18, preferably via coaxial cable 48, to one or more command decoders. In accordance with an aspect of the present invention, the state selection signal may comprise a pattern of pulses, and the command decoder is capable of decoding the pulse pattern. As will be explained, in the preferred embodiment the command decoder may comprise a pulse counter 46. The IRD 18 generates either of two quasi-constant voltage output states to form the pulse patterns. The output voltage states may comprise, for example, a 17 volt output and a 13 volt output. As is well known in the art, because the state selection signal takes the form of DC voltages, the DC voltage supply 58 may derive its power from the state selection signal and may supply power to the command decoder and the LNBs.

The pulse counter 46 decodes the state selection signal and delivers an output to a selection or processing device, such as switch 50 via decoder output line 52 in the illustrated embodiment. Switch 50 is responsive to the pulse counter 46 and receives inputs on lines 38, 40, 42, and 44 from the depolarizers 34, 36. The switch 50 selects one of the input signals on lines 38, 40, 42, 44, and supplies it via line 54 to a low noise amplifier-converter 56. The output of the low noise amplifier-converter 56 is provided to the IRD 18 for processing in known manners.

FIGS. 3A–3D depict one set of pulse patterns which may be used in the implementation of the present invention. FIG. 3A depicts a first pulse pattern 60 corresponding to a first of the state selection signals. FIG. 3B depicts a second pulse pattern 42 corresponding to a second of the state selection signals. FIG. 3C illustrates a pulse pattern 64 corresponding to a third, and FIG. 3D illustrates a pulse pattern 66 corresponding to a fourth of the state selection signals. The four state selection signals are distinguished by pulse count. By way of example, the pulse pattern 62 depicted in FIG. 3B might identify a LHCP signal from satellite 12, whereas the four-count pulse pattern 66 depicted in FIG. 3D might identify a RHCP satellite signal being transmitted from satellite 10. The pulse counter 46 and the pulse patterns of FIGS. 3A–3D comprise a pulse counting system which may take any of a variety of conventional forms. For example, the pulse patterns 60, 62, 64, 66 may each contain a start bit 68 which enables counter 46 of a command decoder. The count may be terminated by stop bits 70 which disable the counter 46. The contents of the counter may be read out on line 54. Other suitable confirmations will be known to those skilled in this art.

It will be understood that the aforedescribed method and apparatus may be implemented in satellite communications system or terrestrial systems. The invention may have particular utility in retrofitting existing satellite IRDs which are capable of selecting between a maximum of two satellite signal characteristics, LHCP and RHCP. In accordance with an aspect of the present invention, in order that such two-state IRDs may be facilitated to receive three or more satellite signal characteristics (or to utilize the present technique for two state selections), software may be downloaded or otherwise provided to the two-state IRDs to adapt them to produce state selection signals having a plurality of distinguishable output states, by novel manipulation of their known two-state constant voltage output circuits.

FIG. 4 is a flow diagram depicting one embodiment of a receiving system under control of software downloaded or otherwise provided to IRDs in accordance with the present invention. The FIG. 4 flow diagram assumes that the satellite receiver is contained in a system having four signal characteristics, namely a first satellite transmitting both right hand circularly polarized ("RHCP 1") and left hand circularly polarized signals ("LHCP 1"), and a second satellite transmitting a right hand circularly polarized ("RHCP 2") and a left hand circularly polarized signals ("LHCP 2"). In the FIG. 4 flow diagram, "CI Record" means channel index record, corresponding to a look-up table or channel map.

Flow diagram element 74 indicates a step wherein a desired channel is selected, for example, by the use of a remote control or IRD-generated channel tuning control. Element 74 represents a process under software control whereby the IRD accesses a look-up table or map to determine which of the signal characteristics (RHCP 1, LHCP 1, RHCP 2, or LHCP 2) corresponds to the chosen channel. The look-up table or map will also typically contain an identification of the specific frequency and packet ID number corresponding to the selected channel, in manners known in the art.

Diagram element 78 represents a step wherein the IRD, having determined which frequency and/or packet ID number applies, supplies an output signal to the IRD's RF tuner circuits to tune the appropriate satellite signal.

Diagram element 80 indicates a step performed within the IRD wherein an index signal corresponding to the appropriate signal characteristic is loaded into a register. Diagram element 82 indicates a contingent step wherein if the appropriate signal characteristic is RHCP 1, then the corresponding format of the state selection signal is one pulse. The one pulse is caused to be generated, under software control, by toggling the output of the IRD to produce one pulse, as shown at 60 in FIG. 3A, for example.

In the particularly preferred embodiment utilizing known two-voltage state output IRDs, the pulse is generated by providing appropriate commands to the IRD output voltage generator. In present systems, the IRD accesses two-state characteristic data from the look-up table or map which indicates whether a desired channel is RHCP or LHCP. This two-state characteristic data causes a control to be provided (e.g. by means of the controller) to an output voltage generator, which outputs either a 13 volt DC level or a 17 volt DC level in known manners. The output is constant, that is, although the output voltage is changed to correspond to the two-state characteristic (LHCP or RHCP), it remains at either 13 volts or 17 volts so long as the corresponding channel has been selected.

In accordance with the present invention, a new control algorithm is provided for the processor-controlled voltage generator. In particular, a "baseline" voltage (preferably 13 volts) is selected, and is the default output. When a state selection signal is commanded (e.g. elements 82–88) an appropriate number of transient voltage states are generated by sending a sequence of voltage level commands to the voltage generator. In the present example corresponding to diagram element 82, the IRD processor will first generate an appropriate control signal to cause the output voltage generator to assume the higher, 17 volt output, then, a short time later, will generate a second control command causing the output voltage generator to return to the lower, 13 volt output state. In this manner, a pulse is generated as shown at 60 in FIG. 3A. This process may be repeated. Accordingly, the standard two-voltage IRD circuits can be utilized to generate one or more pulses, having controllable timing characteristics, under control of the IRD processor and suitable control software whose specific coding is well within the ordinary skill of those practicing in this art.

Referring again to FIG. 3A, the control software may also cause the IRD output voltage generator to toggle between its default or quiescent state (e.g. 13 volts) and its alternate states (e.g. 17 volts) to produce the start bit 68 and stop bits 70. In one embodiment, the "start null" time between start bit 68 and control pulse 60 is selected to be greater than the "pulse null" time separating individual pulses in state selection signals having two or more pulses (e.g. FIGS. 3B–D, pulses 62, 64, and 66, respectively). In this manner, the command decoder in the receiving device (e.g. LNB or satellite selector) may enter a pulse counting mode after receipt of a single pulse followed by a start null time exceeding the pulse null time (and preferably being simultaneously less than some maximum time value, that is, within a window corresponding to valid start bit separations). Once a valid start bit is thus recognized, the pulse counter can begin counting subsequent pulses separated by pulse null times not exceeding a given value. When the "null" time exceeds this value, followed by two pulses 70, the pulses 70 are recognized as stop bits and cause the device to reset to be available for receiving a new state selection signal. In this manner, by utilizing start and stop bits with appropriate timing, a series of state selection signals can be sent in quick succession, thereby accommodating rapid channel changes (e.g. surfing). It will be understood that other control signal schemes may alternatively be used.

Similarly, flow diagram elements 84, 86, and 88 indicate contingent steps performed within the IRD under software control if the chosen channel corresponds to signal characteristics LHCP 1, RHCP 2, or LHCP 2. In the examples shown, the state selection signal for LHCP 1, that is, a two pulse pattern, is shown at FIG. 3B. The state selection signal associated with RHCP 2 (a three pulse pattern) is shown in FIG. 3C. And finally, the state selection signal corresponding to LHCP 2 (a four pulse pattern) is illustrated in FIG. 3D.

The appropriate one of the pulse patterns to select the signal characteristic of the chosen channel is supplied (e.g. via the coax cable) to a pulse counter 46 in the command decoder of a remote device (e.g. multi-mode LNB, and/or satellite signal selector).

Thus, in accordance with an aspect of the present invention, by providing control software effective to toggle the output of the IRD 18 to produce the appropriate pattern of voltage pulses, satellite receiving systems in the field that were previously incapable of receiving signals having three or more characteristics (e.g. RHCP 1, LHCP 1, RHCP 2, and LHCP 2) are rendered capable of selecting and receiving television channels having any of the plurality of signal characteristics.

Concurrently with the loading of the software as aforesaid, the LNB in the embodiment discussed could be replaced with an LNB having the capability of decoding state selection signals comprising a plurality of state transitions, e.g. pulses. External selectors, such as antenna or LNB switches for selecting signals from different antennas or LNBs, may be provided as needed.

It should be understood that a wide range of other changes and modifications may be made to the preferred embodiments described above. It is therefore intended that the foregoing detailed description be regarded as illustrative rather than limiting and that it be understood that it is the following claims, including all equivalents, which are intended to define the scope of the invention.

What is claimed is:

1. For use with a satellite communication system having one or more satellites transmitting signals having a plurality of distinguishable characteristics, said communication system including a number of satellite receiving systems each having an integrated receiver-decoder capable of generating either of two output voltage states intended to command an associated low-noise block converter, a method for enabling said satellite receiving system to select between said plurality of satellite signal characteristics, comprising:

1) in said integrated receiver-decoder:
    a) responsive to selection of a desired channel which may correspond to any one of said plurality of satellite signal characteristics, determining which of said plurality of satellite signal characteristics correspond to said selected channel; and
    b) under software control, developing a state selection signal by toggling said output voltage between a first predetermined level and a second predetermined level to develop a pattern of voltage transitions the number of which comprises greater than zero and defines a plurality of distinguishable selection commands respectively associated with said plurality of signal characteristics;
2) providing said state selection signal to an external device; and
3) in said external device:
    a) responsive to said state selection signal, selecting the particular chosen one of said plurality of signal characteristics corresponding to the particular selection command, said selecting comprising:
        i) decoding said state selection signal by detecting and counting the number of said voltage transitions; and
        ii) responsive to said decoding, selecting one of said plurality of satellite signal characteristics and generating an output containing the satellite signals having the selected characteristic.

2. The method of claim 1 wherein the step of developing a state selection signal comprises developing one or more pulses.

3. The method of claim 1 wherein said plurality consists of three or more.

4. The method of claim 1 wherein said distinguishable characteristics comprise alternate polarizations.

5. The method of claim 1 wherein said distinguishable characteristics comprise satellite locations.

6. The method of claim 1 wherein said distinguishable characteristics comprise signal carrier frequencies.

7. The method of claim 1 wherein said external device comprises an LNB.

8. The method of claim 1 wherein the step of developing a state selection signal includes downloading into said integrated receiver decoder software effective to effect said toggling of said output voltage between said first and second predetermined levels.

9. For use in satellite communication system having one or more satellites transmitting signals having three or more distinguishable characteristics, a satellite receiving system comprising:

means for receiving said signals having three or more characteristics; and a signal selector responsive to a selection command having three or more distinguishable states each represented by a specific number of pulses, said specific number comprising more than zero, for selecting those signals having a particular one of said three or more distinguishable characteristics, said signal selector comprising:
    a selection command decoder for decoding said selection command represented by the specific number of pulses; and
    an apparatus coupled to and responsive to said decoder for generating an output containing those signals having said particular one of said three or more characteristics.

10. The system defined by claim 9 wherein said selection command comprises a pattern having a specific number of pulses, and wherein said selection command decoder includes means for decoding said pattern having a specific number of pulses to identify said particular one of said three or more characteristics.

11. The system defined by claim 10 wherein said selection command comprises a pulse count which is different for each of said characteristics, and wherein said selection command decoder comprises a pulse counter.

12. The system defined by claim 10 wherein said characteristics comprise two satellite locations and two alternate polarization states, and wherein said system includes means for selecting those signals having one of the resulting four characteristics.

13. For use in a satellite communication system having one or more satellites transmitting signals having three or more distinguishable characteristics, the method of receiving the satellite signals comprising:

collecting and receiving satellite signals;

in an integrated receiver-decoder, developing a state selection signal having three or more distinguishable states each represented by a specific number of pulses corresponding to said three or more characteristics said specific number comprising more than zero; and responsive to said state selection signal, selecting those satellite signals corresponding to a particular chosen one of said three or more characteristics identified by said state selection command, said selecting comprising:

decoding said state selection signal to determine the specific number of pulses in the state selection signal; and responsive to said decoding and to said satellite signals, generating an output containing those satellite signals corresponding to said particular chose one of said characteristics.

14. The method defined by claim 13 wherein said state selection signal comprises a pattern of pulses, and wherein said decoding includes decoding said pattern of pulses to identify said particular one of said three or more characteristics.

15. The method defined by claim 14 wherein said state selection signal comprises a pulse count which is different for each of said three or more characteristics, and wherein said decoding includes counting said pulses.

16. For use with a satellite communication system having one or more satellites transmitting signals having three or more distinguishable characteristics, said communication system including a number of satellite receiving systems each having an integrated receiver-decoder capable of generating either of two output voltage states intended to command an associated low-noise block converter, a method for enabling said satellite receiving system to select between said three or more satellite signal characteristics, comprising:

1) in said integrated receiver-decoder:
   a) responsive to selection of a desired channel which may correspond to any one of said three or more satellite signal characteristics, determining which of said satellite signal characteristics correspond to said selected channel; and
   b) under software control, developing a state selection signal by toggling said output voltage between a first predetermined level and a second predetermined level to develop a pattern of voltage transitions the number of which comprises greater than zero and defines three or more distinguishable selection commands respectively associated with said three or more signal characteristics;

2) providing said state selection signal to an external device; and 3) in said external device:
   a) responsive to said state selection signal, selecting the particular chosen one of said three or more signal characteristics corresponding to the particular selection command, said selecting comprising:
      i) decoding said state selection signal by detecting and counting the number of said voltage transitions; and
      ii) responsive to said decoding, selecting one of said three ro more satellite signal characteristics and generating an output containing the satellite signals having the selected characteristic.

17. For use with a satellite communication system having one or more satellites transmitting signals having a plurality of distinguishable characteristics, said communication system including a number of satellite receiving systems each having an integrated receiver-decoder capable of generating either of two output voltage states intended to command an associated low-noise block converter, a method for enabling said satellite receiving system to select between said plurality of satellite signal characteristics, comprising, in said integrated receiver-decoder:

a) responsive to selection of a desired channel which may correspond to any one of said plurality of satellite signal characteristics, determining which of said plurality of satellite signal characteristics correspond to said selected channel; and b) under software control, developing a state selection signal by toggling said output voltage between a first predetermined level and a second predetermined level to develop a pattern of voltage transitions the number of which define a plurality of distinguishable selection commands respectively associated with said plurality of signal characteristics.

18. For use with a satellite communication system having one or more satellites transmitting signals having a plurality of distinguishable characteristics, said communication system including a number of satellite receiving systems each having an integrated receiver-decoder capable of generating either of two output voltage states intended to command an associated low-noise block converter, a method for enabling said satellite receiving system to select between said plurality of satellite signal characteristics by controlling an external device, comprising in said external device, a responsive to a state selection signal generated by said integrated receiver-decoder, selecting a chosen one or more of a plurality of signal characteristics corresponding to the particular selection command, said selecting comprising:

a) decoding said state selection signal by detecting and counting the number of voltage transitions in said state selection signal; and b) responsive to said decoding, selecting one of said plurality of satellite signal characteristics and generating an output containing the satellite signals having the selected characteristic.

19. For use in a communication system having one or more transmitters transmitting signals having three or more distinguishable characteristics, a receiving system comprising:

means for receiving said signals having three or more characteristics; and signal selector responsive to a selection command having three or more distinguishable states each represented by a specific number of pulses for selecting those signals having a particular one of said three or more distinguishable characteristics, said signal selector comprising:

a selection command decoder for decoding said selection command to determine the specific number of pulses in the selection command; and apparatus coupled to and responsive to said decoder for generating an output containing those signals having said particular one of said three or more characteristics.

20. For use in a communication system having one or more transmitters transmitting signals having three or more distinguishable characteristics, the method of receiving the transmitted signals comprising:

collecting and receiving satellite signals;

in an integrated receiver-decoder, developing a state selection signal having three or more distinguishable states each represented by a specific number of pulses corresponding to said three or more characteristics; and responsive to said state selection signal, selecting those transmitted signals corresponding to a particular chosen one of said three or more characteristics identified by said state selection command, said selecting comprising:

decoding said state selection signal to determine the specific number of pulses in the state selection signal; and responsive to said decoding and to said transmitted signals, generating an output containing those signals corresponding to said particular chosen one of said characteristics.

* * * * *